United States Patent
Jurzak (10) Patent No.: US 12,182,205 B2
(45) Date of Patent: Dec. 31, 2024

(54) HANDLING A QUERY FROM A REQUESTOR BY A DIGITAL ASSISTANT WHERE RESULTS INCLUDE A DATA PORTION RESTRICTED FOR THE REQUESTOR

(71) Applicant: MOTOROLA SOLUTIONS, INC., Chicago, IL (US)

(72) Inventor: Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/304,565

(22) Filed: Jun. 23, 2021

(65) Prior Publication Data

US 2022/0414159 A1   Dec. 29, 2022

(51) Int. Cl.
| | |
|---|---|
| *G06F 16/903* | (2019.01) |
| *G06F 16/9038* | (2019.01) |
| *G06F 21/62* | (2013.01) |
| *H04L 51/02* | (2022.01) |

(52) U.S. Cl.
CPC .... *G06F 16/90335* (2019.01); *G06F 16/9038* (2019.01); *G06F 21/62* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 10,417,613 | B1* | 9/2019 | Brisebois | G06F 21/554 |
| 10,425,776 | B2* | 9/2019 | Bestor | H04L 65/4061 |
| 11,189,293 | B1* | 11/2021 | Vijayvergia | G10L 15/30 |
| 2012/0275391 | A1* | 11/2012 | Cui | H04W 72/1247 |
| | | | | 370/329 |

(Continued)

FOREIGN PATENT DOCUMENTS

| | | |
|---|---|---|
| CA | 3073043 A1 | 3/2019 |
| EP | 3644197 A1 | 4/2020 |

OTHER PUBLICATIONS

Ghafghazi Hamidreza et al: "Secure data storage structure and privacy-preserving mobile search scheme for public safety networks", 2016 IEEE Wireless Communications and Networking Conference, IEEE, Apr. 3, 2016 (Apr. 3, 2016), pp. 1-7, XP032959254, DOI: 10.1109/WCNC.2016.7564866 [retrieved on Sep. 12, 2016], all pages.

(Continued)

*Primary Examiner* — Kris E Mackes
*Assistant Examiner* — Soheila (Gina) Davanlou
(74) *Attorney, Agent, or Firm* — Daniel R Bestor (57) ABSTRACT

An electronic digital assistant of an electronic computing device receives a query from a requestor. The assistant determines whether the results of the query include a data portion restricted for the requestor. The assistant determines users having permission to process the data portion restricted for the requestor. The assistant calculates, a priority factor associated with each of users having permission to process the data portion restricted for the requestor. The (Continued)

priority factor is based on at least one criterion defined by a contextual relation between the requestor and respective user. Based on the priority factor a contact person for the data portion restricted for the requestor is selected.

15 Claims, 6 Drawing Sheets

(56) References Cited

U.S. PATENT DOCUMENTS

| | | | |
|---|---|---|---|
| 2014/0065997 A1* | 3/2014 | Walker | H04W 4/90 |
| | | | 455/404.1 |
| 2018/0276309 A1* | 9/2018 | Sagiv | G06F 40/205 |
| 2019/0108326 A1 | 4/2019 | Fujimaki | |
| 2020/0251111 A1* | 8/2020 | Temkin | G10L 15/22 |
| 2021/0304096 A1* | 9/2021 | Kirubakaran | H04L 47/2441 |

OTHER PUBLICATIONS

Ghafghazi Hamidreza et al: "Location-Aware Authorization Scheme for Emergency Response", IEEE Access, vol. 4, Sep. 16, 2016 (Sep. 16, 2016), pp. 4590-4608, XP011622828, DOI: 10.1109/ACCESS.2016.2601442 [retrieved on Sep. 13, 2016].

The International Search Report and the Written Opinion of the International Searching Authority, corresponding Patent Application Serial No. PCT/US2022/032949, filed: Jun. 10, 2022, mailed: Oct. 4, 2022, all pages.

* cited by examiner

| | ASSIGNED TO THE SAME INCIDENT SCENE AS THE REQUESTOR? (YES – 1, NO - 0) | MEMBER OF THE SAME TALK GROUP AS THE REQUESTOR? (YES – 1, NO - 0) | ENGAGED IN THE SAME TASK AS THE REQUESTOR? (YES – 1, NO - 0) | SUPERVISOR? (YES – 1, NO - 0) | DISPATCHER? (YES – 1, NO - 0) | DISTANCE TO THE REQUESTOR (VERY CLOSE – 1, FAR AWAY – 0) | WORKLOAD (LOW – 1, MEDIUM -0.5, HIGH - 0) | PRIORITY FACTOR |
|---|---|---|---|---|---|---|---|---|
| WEIGHT | 0.5 | 0.4 | 0.9 | 0.7 | 0.4 | 1 | 0.7 | |
| USER A (PARAMEDIC) | 1 | 1 | 0 | 0 | 0 | 0.9 | 1 | 2.5 |
| USER B (SUPERVISOR I) | 0 | 1 | 1 | 1 | 0 | 0.4 | 0 | 2.4 |
| USER C (SUPERVISOR II) | 0 | 1 | 0 | 1 | 0 | 0 | 0.5 | 1.45 |
| USER D (DISPATCHER) | 0 | 0 | 0 | 0 | 1 | 0 | 0 | 1 |

HANDLING A QUERY FROM A REQUESTOR BY A DIGITAL ASSISTANT WHERE RESULTS INCLUDE A DATA PORTION RESTRICTED FOR THE REQUESTOR

BACKGROUND OF THE INVENTION

Tablets, laptops, phones (e.g., cellular or satellite), mobile (vehicular) or portable (personal) two-way radios, and other mobile computing devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such mobile computing devices further comprise, or provide access to, digital assistants (or sometimes referenced as "virtual partners") that can provide the user thereof with valuable information in an automated (e.g., without further user input) or semi-automated (e.g., with some further user input) fashion.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, warning users of nearby dangers such as traffic accidents or environmental hazards, and providing many other types of information in a reactive or proactive manner.

A digital assistant may be employed in a public-safety environment, so that simple tasks requested by an officer or dispatch center is performed by the digital assistant. Such tasks include such things as, but not limited to, a request for a status update, filtering un-needed messages during busy times, a query of a public safety database for one of a name, physical attribute, address, birth date, vehicle ownership, property ownership, or past criminal activity associated with a person or entity mentioned in the query, etc.

The public safety databases or the data portions in a single database may have different security levels assigned. Therefore, a requestor, such as a police officer, may not be authorized to receive all the results of the query. Digital assistant can provide information that is adjusted to specific requestor authorization level. However, a data portion "hidden" for the requestor may be important to perform a task efficiently and safely. Thus, there exists a need for an improved technical method, device, and system for an electronic digital assistant to handle a query from a requestor by a digital assistant, where results of the query include a data portion restricted for the requestor.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a method, apparatus, and non-transitory, computer-readable storage media for handling a query from a requestor by electronic digital assistant is provided herein. During operation a digital assistant will receive a query from a requestor. The digital assistant will perform a database search obtaining the results of the query and will determine whether the results of the query include a data portion restricted for the requestor (for example a medical data). The digital assistant will determine users having permission to process the data portion restricted for the requestor and will calculate a priority factor for said users, based on at least one criterion defined by a contextual relation between the requestor and respective user.

Based on the priority factor a contact person for the data portion restricted for the requestor is selected. The contact person may be notified about the one or more of: the query, the requestor, the data portion restricted for the requestor, and therefore decide whether to react on this and contact the requestor. Additionally or alternatively, the requestor may be notified about the contact person.

Figure 1:
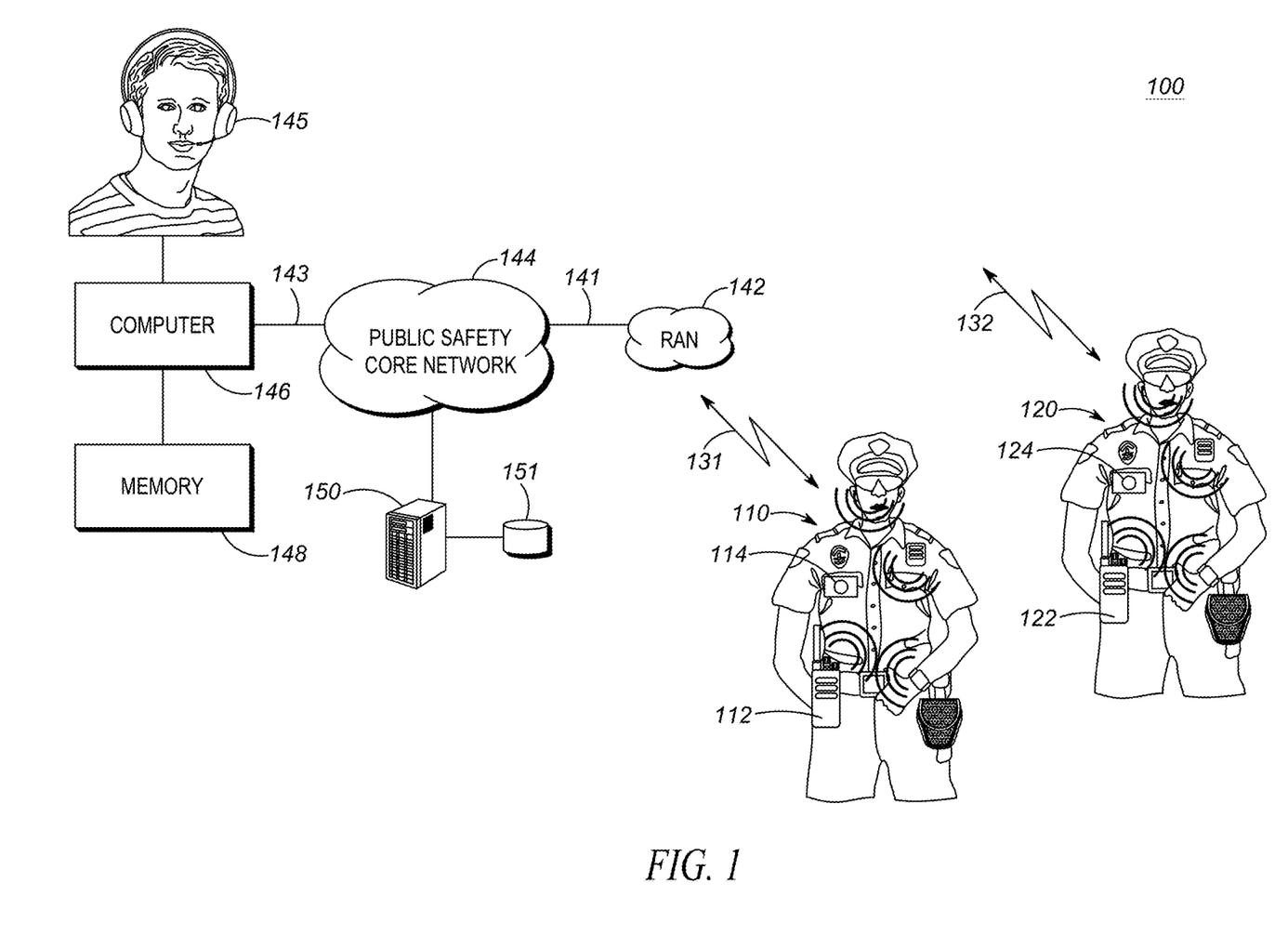
FIG. 1 is a system diagram illustrating a system for operating an electronic digital assistant, in accordance with some embodiments.

Turning now to the drawings, wherein like numerals designate like components, FIG. 1 illustrates an operational environment for the present invention, a communication system 100.

As shown in FIG. 1, a public-safety officer 110 has an array of devices to use during the officer's shift. For example, the officer may have one radio 112 and one camera 114. He may also have other devices, like for example a wireless microphone, a smart watch, smart handcuffs, a man-down sensor etc. All devices pulled by the officer are configured to form a personal area network (PAN) by associating (pairing) with each other and communicating wirelessly among the devices. One or several devices may be configured with a digital assistant (virtual partner).

FIG. 1 illustrates also an additional user 120 with respective additional set of same or similar devices as the officer 110, namely a radio 122 and a camera 124. User 120 may be geographically proximate to (or not geographically proximate to) the officer 110. The user 120 may be also a public-safety officer, for example a supervisor of the officer 110. In some embodiments the user 120 may be a paramedic or a firefighter being assigned to the same incident scene as the officer 110.

System 100 further includes one or more radio access networks (RANs) 142, a public-safety core network 144, computer 146 with an internal or external memory 148 storing the databases, server 150 coupled to a database 151 and communication links 141, 143, 131, 132.

RAN 142 includes typical RAN elements such as base stations, base station controllers (BSCs), routers, switches, and the like, arranged, connected, and programmed to provide wireless service to user equipment in a manner known to those of skill in the relevant art. RAN 142 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 142 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 142 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the radio 112 may form the hub of communication connectivity for the officer 110, through which other accessory devices such as camera 114 or smart watch may communicatively couple. In order to communicate with and exchange video, audio, and other media and communications with the accessory devices the radio 112 may contain one or more physical electronic ports (such as a USB port, an Ethernet port, an audio jack, etc.) for direct electronic coupling with the accessory devices and/or may contain a short-range transmitter (e.g., in comparison to the long-range transmitter such as a LMR or Broadband transmitter) and/or transceiver for wirelessly coupling with the accessory devices. The short-range transmitter may be a Bluetooth, Zigbee, or NFC transmitter having a transmit range on the order of 0.01-100 meters, or 0.1-10 meters. In other embodiments, the accessory devices may contain their own long-range transceivers and may communicate with one another and/or with the infrastructure RAN 142 directly without passing through radio 112 or 122, over respective wireless communication link(s) 131, 132.

In other embodiments, a hub may be formed by any other suitable computing and communication device configured to serve as a PAN primary device and to engage in wireless communication with the RAN 142 over the air interface as is known to those in the relevant art.

Public-safety core network 144 may include one or more packet-switched networks and/or one or more circuit-switched networks, and in general provides one or more public-safety agencies with any necessary computing and communication needs, transmitting any necessary public-safety-related data and communications.

It should also be noted that any one or more of the communication links 141, 143, could include one or more wireless-communication links and/or one or more wired-communication links.

Server 150 serves as a search engine and performs searching of database 151 as is commonly known in the art. Server 150 may comprise a commercial search server such as, but not limited to Google®, Yahoo®, Amazon®, . . . , etc. Alternatively, server may comprise a proprietary, internal server that performs searching on internal databases. Regardless of what type of search engine is provided, server 150 receives a query from the radio 112 associated with a the officer 110 being a requestor, searches database 151, obtains results of the query and provides a response—an information that is adjusted to specific requestor authorization level, i.e. not comprising a data portion restricted for the requestor.

As shown, server 150 is coupled to the database 151. Database 151 comprises information to be searched. For example, database 151 may comprise web site addresses and content, crime history, department of motor vehicle (DMV) data, . . . , a video repository, an image repository, . . . , etc. It should be noted that although only one server 150 is shown coupled to database 151, there may exist many servers 150 providing searching capabilities, with each server 150 having its own database 151.

In one embodiment of the present invention, server 150 is shown as a separate entity from computer 146. However, in an alternate embodiment of the present invention, server 150 may lie internal to computer 146.

Computer 146 comprises, or is part of a computer-aided-dispatch center, manned by a dispatcher 145, providing necessary dispatch operations. For example, computer 146 is a part of a dispatch console that comprises a graphical user interface that provides the dispatcher necessary information about public-safety officers or other users (paramedics, firefighters). Some of this information originates from accessory devices providing information to radio 112, which forwards the information to RAN 142 and ultimately to computer 146. Computer 146 may be further configured to receive and store information about the relations between the users (who is a supervisor or a commander of a certain officer), their assignments (which officers are engaged in a certain task), current location etc. The information is preferably stored in a dedicated database in memory 148.

Figure 2:
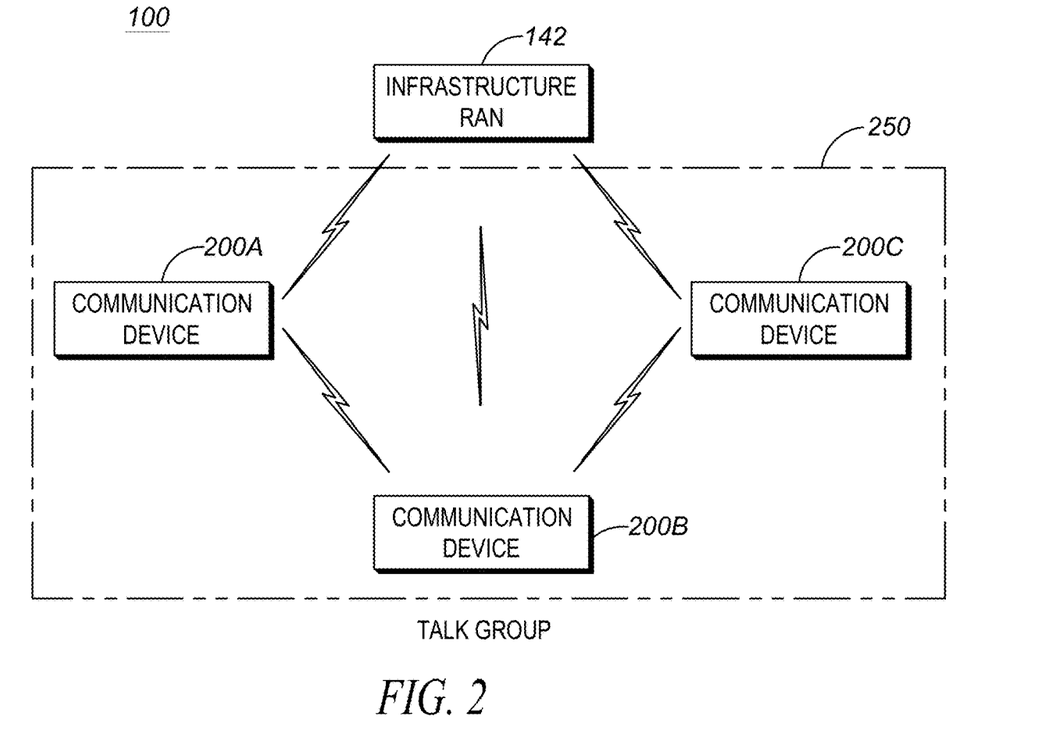
FIG. 2 is a system diagram illustrating a plurality of communication devices of FIG. 1 that are associated with a talk group and that may be located at varying locations, in accordance with some embodiments.

Many of the devices shown in FIG. 1 (such as the radio 112, the radio 122, the dispatch console of the dispatcher 145) may be referred to as communication devices (for example, communication devices 200A, 200B, 200C shown in FIG. 2).

For example, as shown in FIG. 2, multiple communication devices 200A-200C may form a talk group 250 and may be dispersed across a wide geographic area. The communication device 200A may be associated with a first user located at a first location, the communication device 200B may be associated with a second user located at a second location, and the communication device 200C may be associated with a third user located at a third location. The first, second, and third locations may be geographically the same or different from one another.

Further, as shown in FIG. 2, the communication devices 200A, 200B, and 200C are members of the same talk group, i.e., talk group 250. Although not shown in FIG. 2, each of the communication devices 200A, 200B, 200C may also be associated with one or more talk groups other than the talk group 250.

Figure 3:
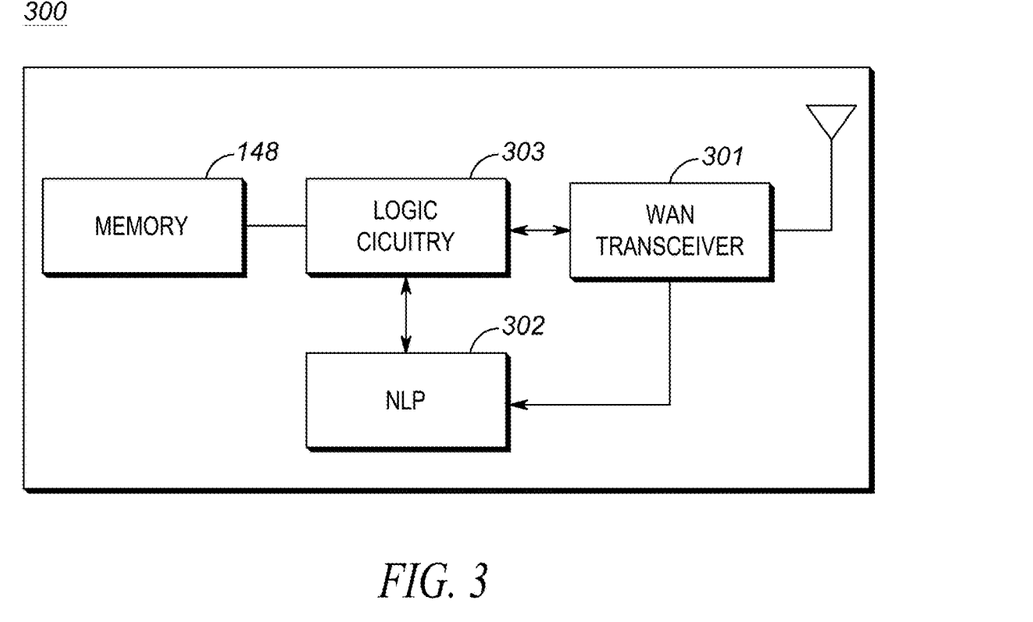
FIG. 3 is a device diagram showing a device structure of an electronic computing device for operating an electronic digital assistant, in accordance with some embodiments.

FIG. 3 sets forth a schematic diagram that illustrates an electronic processing device 300 for handling a digital assistant query as described above. In an embodiment, the device is embodied within computer 146, however in alternate embodiments the device may be embodied within the public-safety core network 144, or more computing devices in a cloud compute cluster (not shown), radio 112, or some other communication device not illustrated in FIG. 1, and/or may be a distributed communication device across two or more entities.

FIG. 3 shows those components (not all necessary) for device 300 to provide virtual-partner functionality. Device 300 may include a wide-area-network (WAN) transceiver 301 (e.g., a transceiver that utilizes a public-safety communication-system protocol), Natural Language Processor (NLP) 302, logic circuitry 303 (which may serve as a digital assistant). In other implementations, device 300 may include more, fewer, or different components. Regardless, all components are connected via common data busses as known in the art.

WAN transceiver 301 may comprise well known long-range transceivers that utilize any number of network system protocols. (As one of ordinary skill in the art will recognize, a transceiver comprises both a transmitter and a receiver for transmitting and receiving data). For example, WAN transceiver 301 may be configured to utilize a next-generation cellular communications protocol operated by a cellular service provider, or any public-safety protocol such as an APCO 25 network or the FirstNet broadband network. WAN transceiver 301 receives communications from officers. It should be noted that WAN transceiver 301 is shown as part of device 300, however, WAN transceiver 301 may be located in RAN 142 (e.g., a base station of RAN 142), with a direct link to device 300.

Additionally, transmitter (part of transceiver 301) is provided and configured to transmit a query from a requestor (for example the officer 110) to a search engine. More specifically, the query from the requestor is converted to a format suitable for over-the-air transmission. This may comprise an appropriately-modulated text string suitable for transmission over RAN 142 to computer 146 or server 150.

Receiver (part of transceiver 301) is provided and configured to receive data (e.g., search results) from a search engine in response to the query. Search results from the database search are then transmitted to radio 112 via RAN 142.

NLP 302 may be a well-known circuitry to analyze, understand, and derive meaning from human language in a smart and useful way. By utilizing NLP 302, automatic summarization, translation, named entity recognition, relationship extraction, sentiment analysis, speech recognition, and topic segmentation can take place.

Logic circuitry 303 comprises a digital signal processor (DSP), general purpose microprocessor, a programmable logic device, or application specific integrated circuit (ASIC) and is configured to determine whether the results of a query include a data portion restricted for a requestor, determine users having permission to process the data portion restricted for the requestor, for example user 120 and dispatcher 125, calculate a priority factor associated with each of users having permission to process the data portion restricted for the requestor, and based on the priority factor, select a contact person for the data portion restricted for the requestor.

Logic circuitry 303 along with NLP 302 is also configured to serve as a digital assistant/virtual partner in order to handle a query as described above. For example, logic circuitry may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

In some embodiments, an electronic processing device for handling a digital assistant query may be operable to perform, among other functions, all or a portion of the methods described herein for handling a digital assistant query whose results include a data portion restricted for a requestor.

Moreover, an embodiment can be implemented as a non-transitory, computer-readable storage medium having program instructions stored thereon that when executed by one or more processors cause the one or more processors.

Figure 4:
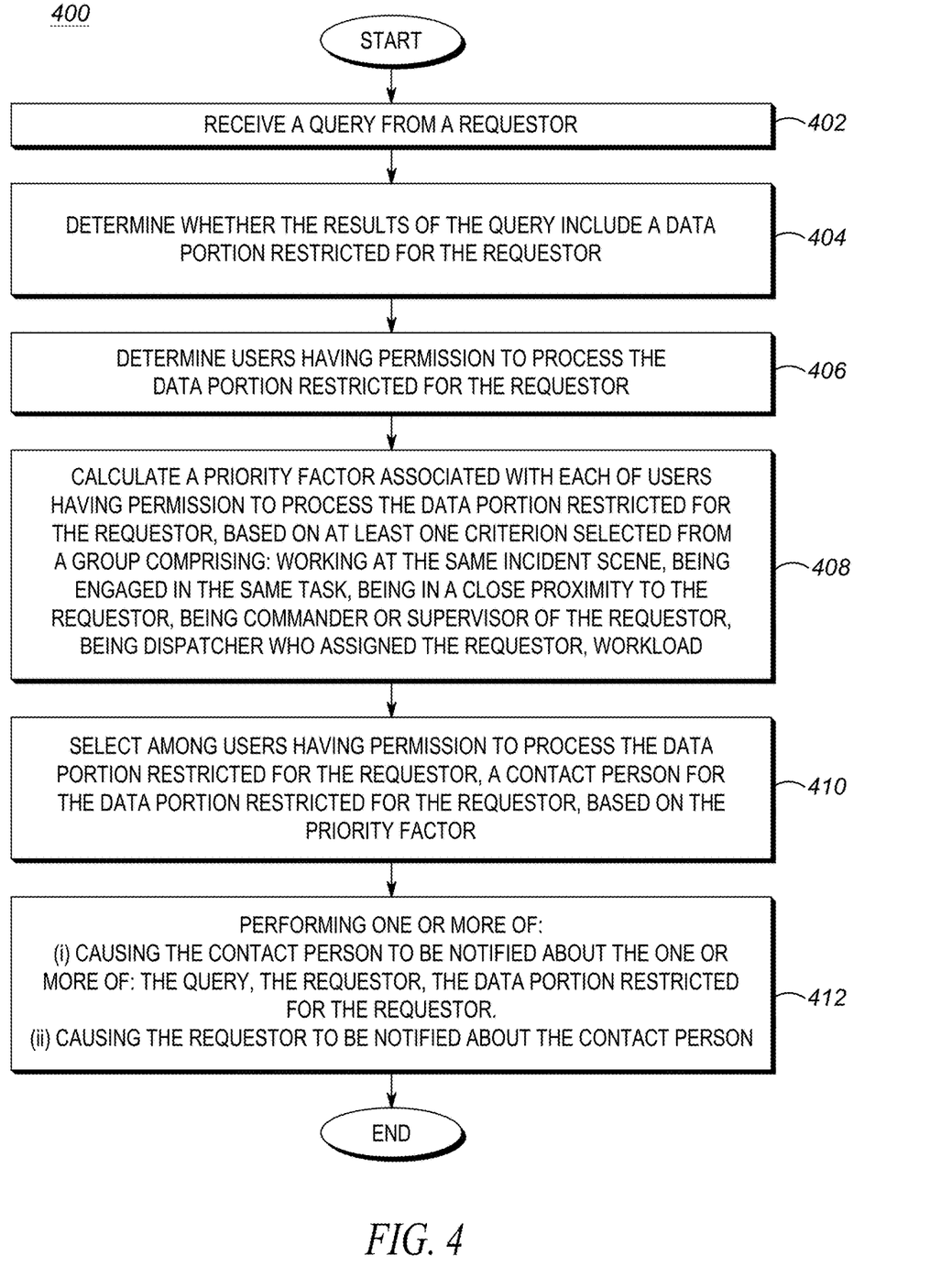
FIG. 4 illustrates a flowchart setting forth process steps for operating the electronic digital assistant of FIGS. 1 and/or 3, in accordance with some embodiments.

Process 400 begins at step 402, where WAN transceiver 301 receives a query from a requestor.

For example, the received query could be a public safety query of a public safety database for one of a name, physical attribute, address, birth date, vehicle ownership, property ownership, or past criminal activity associated with a person or entity mentioned in an input audio signal.

At step 404, logic circuitry 303 determines that the results of the query include a data portion restricted for the requestor. This can be done for example by comparing the results with an access control list maintained by the system 100. At step 406 logic circuitry 303 determines users having permission to process the data portion restricted for the requestor. This step may be performed in many different ways. Some embodiments will be described later in this document.

At step 408, logic circuitry 303 calculates a priority factor for determined users having permission to process the data portion restricted for the requestor, based on at least one criterion defined by a contextual relation between the requestor and respective user. At least one criterion defined by a contextual relation between the requestor and respective user may be selected from: being assigned to the same incident scene as the requestor, being engaged in the same task as the requestor, being a member of the same talk group as the requestor, being a commander or a supervisor of the requestor, being a dispatcher who assigned the requestor, and a distance from the requestor. The priority factor can be further based also on a workload of respective user.

Each of criteria may be of discreet or continuous character. For example, "being assigned to the same incident scene as the requestor" or "being a dispatcher who assigned the requestor" are of discrete binary character, which means that each of the users either meets or does not meet a criterion. With each of the state certain value may be assigned. Usually 0 and 1 are used for not meeting and meeting the criterion, respectively. An example of criterion of continuous character is a "distance from the requestor" which can take any value greater than zero (5 meters as well as 50 kilometers). It may be more convenient to convert a continuous interval to discrete values, for example by diving said interval into finite number of disjoint ranges. With each of the ranges certain value may be assigned, for example 1 for first range (distance ≤25 meters), 0.9 for second range (distance >25 and ≤100 meters), 0.8 for third range (distance >100 meters and ≤1 kilometer), ..., 0 for last range (distance >10 kilometers). All values assigned with certain states or ranges may be normalized into the interval [0,1]. A priority factor may be calculated as a sum of the values assigned to a given user for each of the criteria.

In some embodiments, a weight may be assigned to each criterion. For example, "distance from the requestor" may have the weight 1, while "being a dispatcher who assigned the requestor" may have the weight 0.4. Thus some criteria may be prioritized over others. In such embodiments, a priority factor may be calculated as a sum of products of the values assigned to a given user for each of the criteria and the respective weights.

Based on the priority factor calculated at step 408, logic circuitry 303 selects at step 410, among users having permission to process the data portion restricted for the requestor, a contact person for the data portion restricted for the requestor.

If the higher values are assigned with the more preferred states of a user (for example higher value is associated with the users being close to the requestor, while lower values are assigned for the users being far from the requestor), a person having the highest priority factor is selected as a contact person for the data portion restricted for the requestor.

The process may further comprise the step 412 of causing, by the logic circuitry 303, the contact person to be notified about the one or more of the query, the requestor, the data portion restricted for the requestor. In some embodiments the contact person is notified who performed a query, what was the topic of the query and which part of the results of the query is restricted for the requestor. However, in some cases only part of this information may be sufficient. For example, notifying the contact person about the requestor allows him to contact the requestor, ask about the query, perform the query itself, receive a response including a data portion restricted for the first requestor and decide to reveal the data portion to the requestor or to use them in a different way.

Additionally or alternatively, the requestor may be notified that the contact person has permission to process the data portion restricted for him. This may facilitate obtaining the information by the requestor or make him to postpone making a decision until receiving important information, especially when the contact person is busy when notified and cannot process this notification immediately.

In some embodiments, the step of determining users having permission to the data portion restricted for the requestor is performed only for users being in relation with the requestor in a communication system. The user being in relation with requestor may be one of a supervisor of the requestor, a commander of the requestor, a dispatcher who assigned the requestor, a user of the same talk group, a user being within proximity to the requestor, a user assigned to the same task or a user assigned the same incident.

Beside handling a data portion restricted for a requestor, the process may comprise the steps of generating by the logic circuitry 303 a response to the query for the requestor based on the results of the query not including the data portion restricted for the requestor and causing this response to be provided to the requestor. Said response to the query may be provided to requestor immediately, i.e. without any delay caused by handling a data portion restricted for a requestor. In this way, the requestor can quickly obtain information to which he has access and the possibility of obtaining additional information is provided.

Therefore, in some embodiments, once a response to the query for the requestor is generated, the logic circuitry 303 causes the response to be provided to the requestor. For example, the logic circuitry 303 may compose a text message response, an e-mail response, an audio response, a video response or an instant message response, and provide the response to the requestor by providing the composed text message response, e-mail response, an audio response, a video response or instant message response to a text message server, e-mail server, an audio response server, a video response server or instant message server accompanying identities of the requestor for further distribution of the response to the requestor. The received text message, e-mail, an audio response, a video response or instant message could then be displayed or played back (e.g., via a text-to-voice feature) at the requestor device according to requestor's device's configuration.

In still other embodiments, the logic circuitry 303 may request one or more narrowband or broadband voice channels from a PTT controller, zone controller, or the like that connects with the requestor, and may provide the response to the requestor via the one or more established voice channels (e.g., perhaps via a voice-to-text playback of generated response provided over multiple private/unicast calls or over a single multicast/talkgroup call established with the requestor, among other possibilities) using any one or more of the broadband and narrowband applications or protocols set forth earlier. Other examples are possible as well.

In still other embodiments, the response to the query may produce media other than text, such as image, graphics, or video, which may be provided to the requestor in a same or similar manner to that discussed above, but which may also be delivered by providing a uniform resource locator (URL) link that, once activated, allows the receiving device to retrieve the corresponding image, graphics, or video. In still further embodiments, the results of the database query may be an instruction to perform a function, such as changing a radio to a particular channel or to a particular talkgroup, to increase or decrease a volume of the radio, to report a current location, or perform some other function.

The same methods as the methods of providing a response to a requestor described above may be used for notifying the contact person about a query or for notifying the requestor about the contact person.

Figure 5:
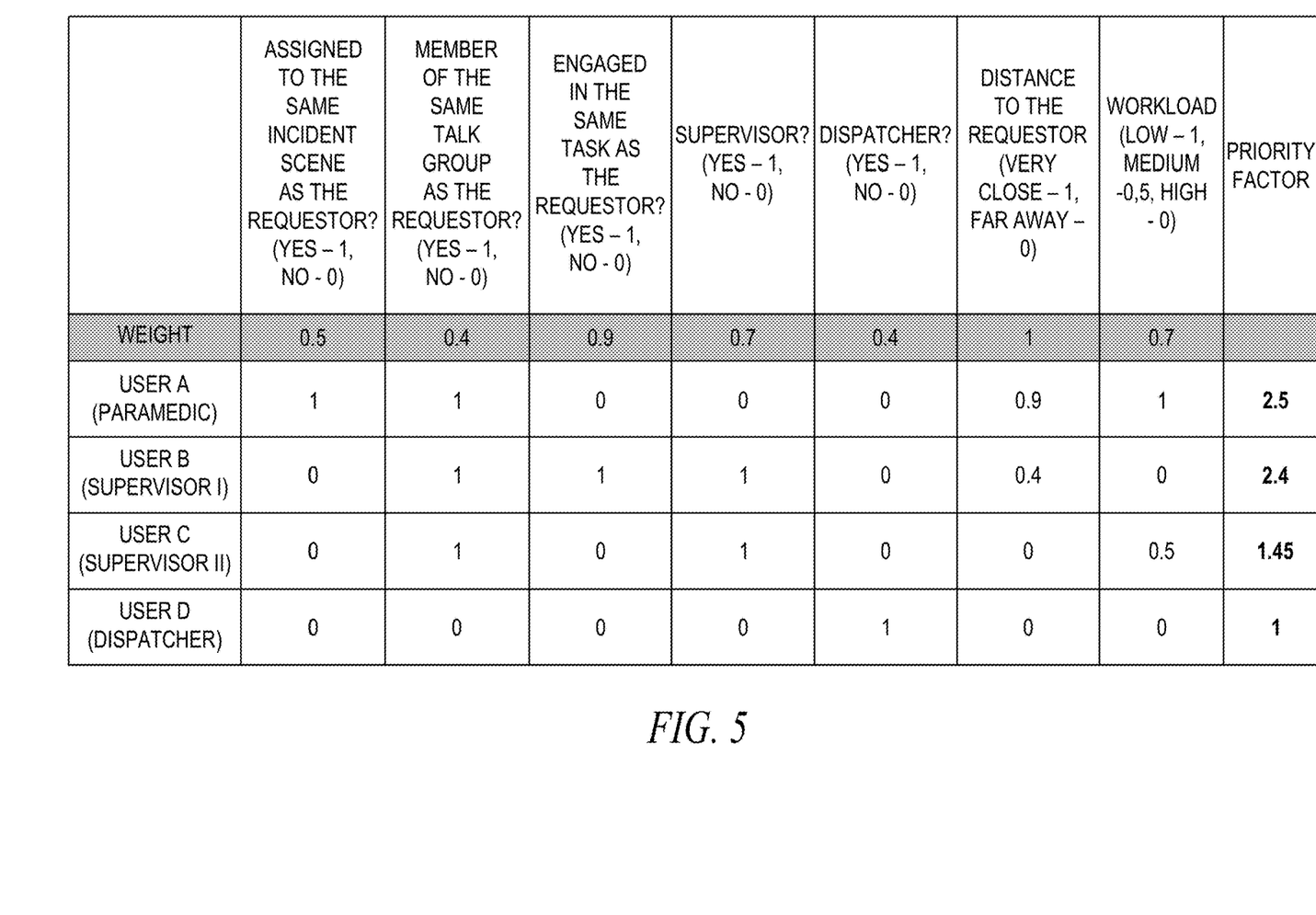
FIG. 5 is a table showing the step of calculating a priority factor in an example case.

FIG. 5 shows the step of calculating a priority factor in an example case of a police officer McNulty examining the circumstances of a car accident caused by a driver described by the witnesses as behaving like a person under the influence of alcohol. The police officer (the requestor) asks a virtual partner to get more information about the driver John Smith. The results of the query may include information that he is a stockbroker, sentenced for hitting a police officer ten years ago and he is diabetic, however the police officer may not have access to a medical data. Therefore, officer McNulty may immediately receive a response to his query: "John Smith is a stockbroker, sentenced for hitting a police officer ten years ago".

Meanwhile, responsive to determining that the results of the query include a data portion (the medical data) restricted for the requestor and determining users having permission to process the data portion restricted for the requestor, a priority factor associated with each of said users is calculated. In this exemplary embodiment the criteria are: being assigned to the same incident scene, being engaged in the same task, being a member of the same talk group, being a supervisor of the requestor, being a dispatcher who assigned the requestor, a workload, a distance from the requestor. The step of calculating the priority factors was performed only for users being in relation with the requestor in a communication system. The users being in relation with the requestor, identified as having access to said medical data are:

User A—Doug Ross, a paramedic, being assigned to the same incident scene and being a member of the same talk group with the police officer, being around 50 meters from the police officer and who finished his activities relating to providing assistance to the victims of the accident, User B—Lieutenant Cedric Daniels, a supervisor of the police officer, being a member of the same talk group with the police officer and being engaged in the same task, User C—Major William Rawls, a supervisor of the police officer, being a member of the same talk group with the police officer, User D—a dispatcher, who assigned the police officer to this accident.

In this case, the highest priority factor is calculated for the User A and he is selected as a contact person. He may receive the information: "Officer McNulty being assigned to the same incident scene asked about John Smith, but he does not receive the information that John Smith is a diabetic". Alternatively, he may receive the information: "Contact Officer McNulty to help him to retrieve important information" or "John Smith is a diabetic". Additionally or alternatively, officer McNulty may receive a notification: "Paramedic Doug Ross is authorized to receive more information about John Smith" or "Contact Paramedic Doug Ross to obtain more information".

In some embodiments the process may comprise a step of determining if data portion restricted for the requestor comprises information relevant to perform a task. In such embodiments, the logic circuitry 303 may for example compare the data portion restricted for the requestor with the context of the task and perform the steps of calculating a priority factor and selecting a contact person only if the data portion comprises information important for the task. In above example of examining the circumstances of the car accident the medical data of John Smith are relevant. However, the same query about John Smith may be asked by the same officer McNulty on his way to Mr. Smith's house to question him as a witness to the theft at a store. In this case medical data of Johns Smith are not relevant, so the steps of determining users having permission to process the data portion restricted for the requestor, calculating the priority factors and selecting a contact person are not performed by the logic circuitry 303.

As mentioned above, the step of determining users having permission to the data portion restricted for the requestor may be performed in many different ways. One embodiment is illustrated on FIG. 6. Process 500 begins at step 502, where the WAN transceiver 301 receives a query from a requestor. At step 504 a response to the query for the requestor is generated by the logic circuitry 303, based on the results of the query not including the data portion restricted for the requestor. At step 506, for at least two users other than the requestor, a response to the query for the user is generated, based on the results of the query not including the data portion restricted for the user and a data set difference between the response to the query for the user and the response to the query for the requestor is determined. At step 508 the users for whom the data set difference comprises at least one element and this element is not a part of response to the query for the requestor are thus identified as users having permission to the data portion restricted for the requestor.

Figure 6:
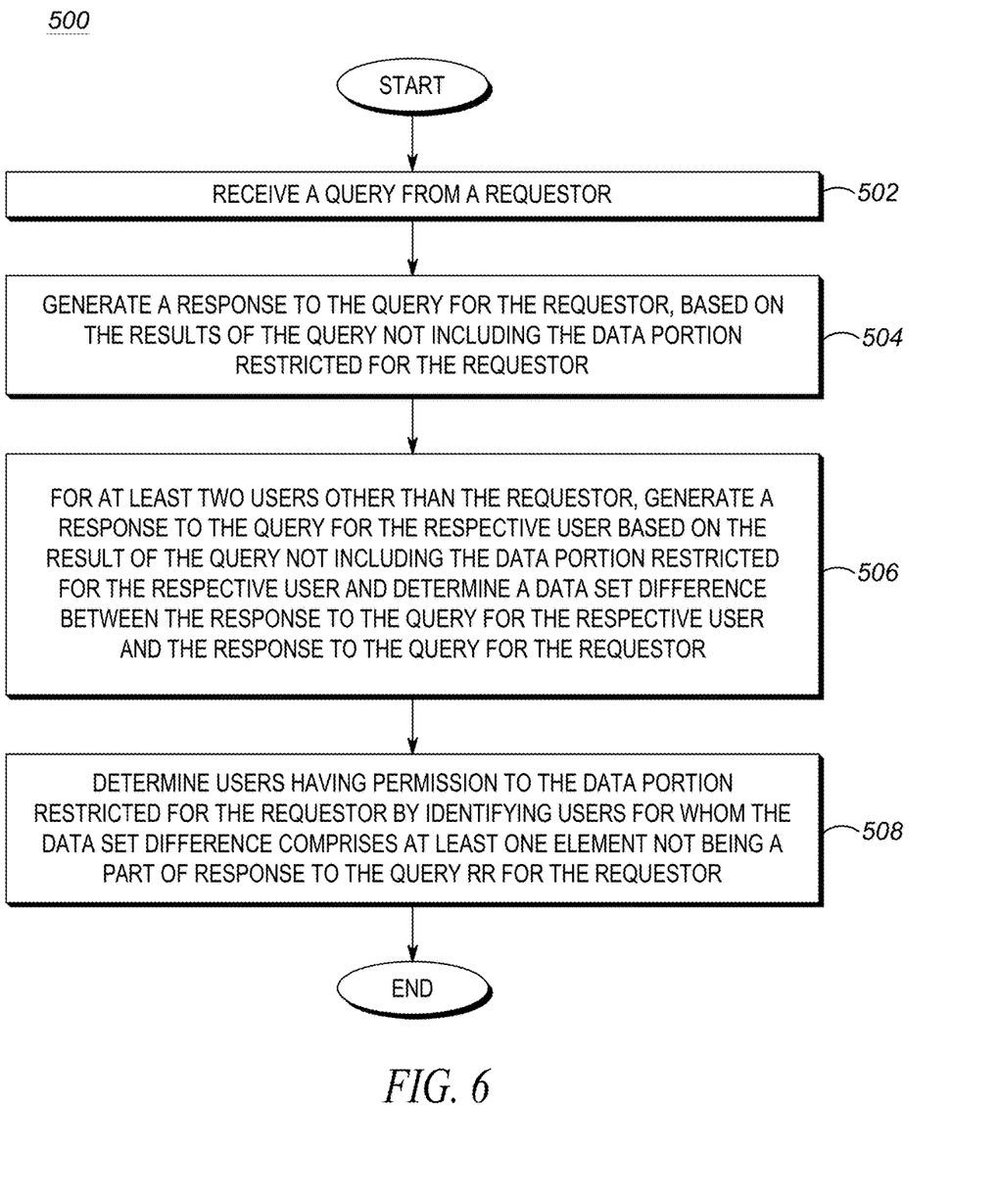
FIG. 6 and FIG. 7 are a flowcharts setting forth process steps of determining users having permission to the data portion restricted for the requestor, in accordance with some embodiments.

In some cases, a data set difference between a response to the query for the requestor and the responses to the query for some users may comprise more than one element not being a part of response to the query for the requestor. This means that the requestor does not have access to at least two data portions. In such cases, for each element of said data set difference not belonging to the response to the query for the requestor, a group of users having permission to process data comprising this element of said data set difference may be identified and the steps of calculating a priority factor and selecting a contact person for this element of said data set difference may be performed. The steps of calculating the priority factors and selecting a contact person may be omitted for the elements of the data set difference identified by the electronic digital assistant as not relevant to perform a task.

A number of elements of the data set difference not being a part of response to the query for the requestor calculated for a certain user may be one of criteria on which the priority factor is based. In this case users having access to more elements of the data set difference (for example medical data and criminal records) are better candidates for a contact person.

Figure 7:
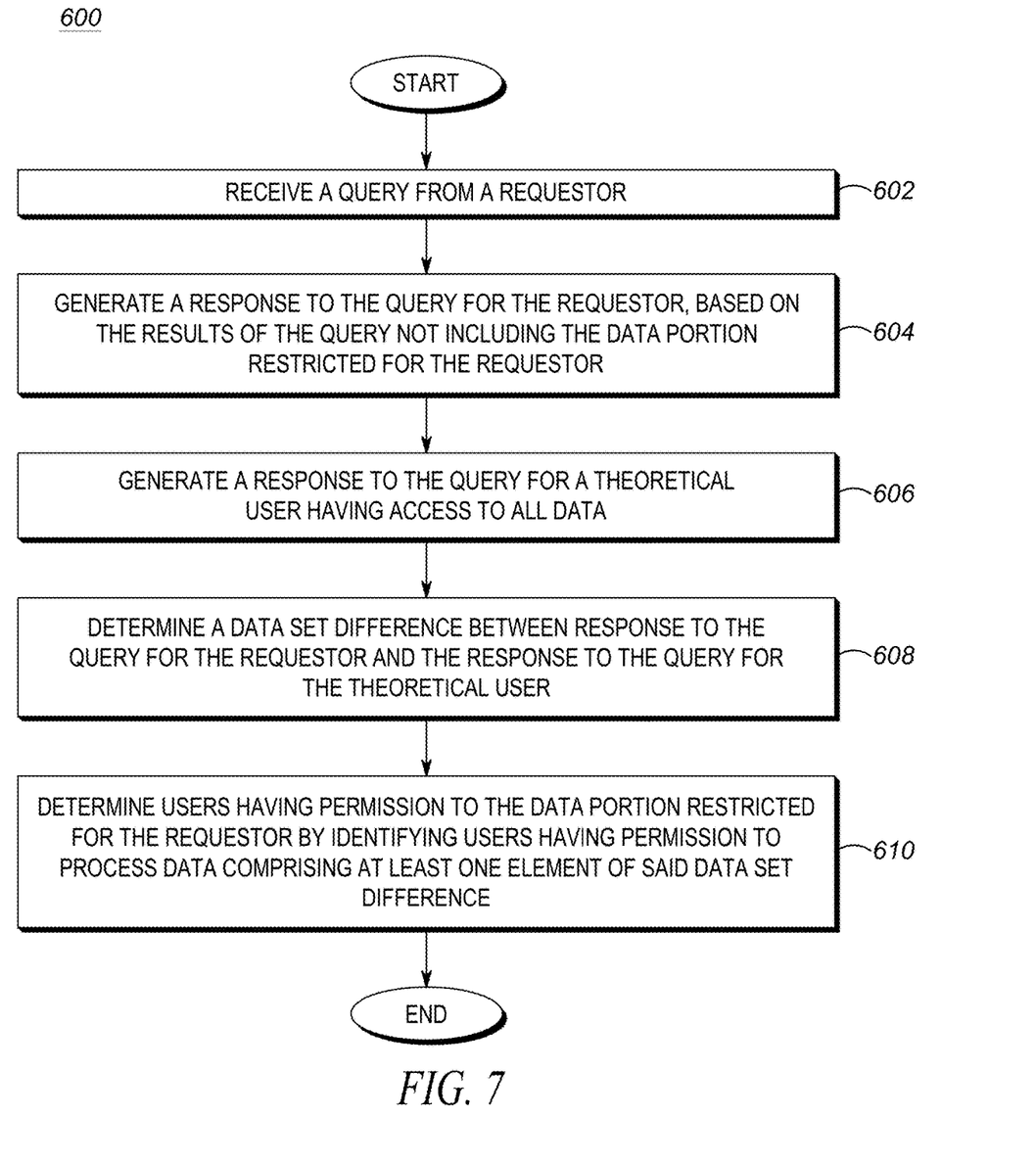

In a further embodiment, illustrated on FIG. 7 the steps of determining whether the results of a query include a data portion restricted for a requestor and determining users having permission to the data portion restricted for the requestor are performed with the use of a theoretical user having access to all data. Process 600 begins at step 602, where the WAN transceiver 301 receives a query from a requestor. At step 604 a response to the query for the requestor is generated by the logic circuitry 303, based on the results of the query not including the data portion restricted for the requestor. At step 606 a response to the query for a theoretical user having access to all data is generated. The order of the steps 604 and 606 is optional. At step 608 a data set difference between response to the query for the requestor and the response to the query for the theoretical user is calculated. At step 610 users having permission to the data portion restricted for the requestor are identified by identifying users having permission to process data comprising at least one element of said data set difference. Further steps of calculating the priority factors and selecting a contact person may be performed for users being in relation with the requestor in a communication system.

In some cases, a data set difference between a response to the query for the requestor and the response to the query for a theoretical user may comprise more than one element. This means that the requestor does not have access to at least two data portions. In such cases, for each element of said data set difference, a group of users having permission to process data comprising this element of said data set difference may be identified and the steps of calculating a priority factor and selecting a contact person for this element of said data set difference may be performed. The steps of calculating the priority factors and selecting a contact person may be omitted for the elements of the data set difference identified by the logic circuitry 303 as not relevant to perform a task.

A number of elements of the data set difference which a certain user has permission to process may be calculated and may be one of criteria on which the priority factor is based.

CONCLUSION

In accordance with the foregoing, an improved device, method, and system is disclosed for an electronic digital assistant to handle a query from a requestor, where the results of the query include a data portion restricted for the requestor.

As a result of the foregoing, and in some embodiments, electronic digital assistants may computationally determine optimal person to be a contact person for the data portion restricted for the requestor, allowing electronic digital assistant to notify the contact person about the one or more of the query, the requestor, the data portion restricted for the requestor or to notify the requestor about the contact person. Therefore possibility is provided for the requestor to obtain additional information compared to traditional inquiries and responses processed by conventional electronic digital assistants and based on the results of the query not including the data portion restricted for the requestor, without requiring any changes to security levels assigned to the different databases and without requiring large datasets and time-consuming training periods required by deep-learning and other machine learning mechanisms. Other features and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture.

It is contemplated that any part of any aspect or embodiment discussed in this specification can be implemented or combined with any part of any other aspect or embodiment discussed in this specification.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for handling a query from a requestor by a digital assistant, the method comprising:
   receiving, at an electronic computing device, the query from a requestor device associated with the requestor;
   performing, at an electronic computing device, a database search and obtaining the results of the query;
   determining, at an electronic computing device, whether the results of the query include a data portion restricted for the requestor, wherein the data portion restricted for the requestor has a security level assigned, the requestor has an authorization level assigned and the requestor is not authorized to access the data portion;
   responsive to determining that the results of the query include the data portion restricted for the requestor, determining, at an electronic computing device, users having permission to process the data portion restricted for the requestor;
   for determined users having permission to process the data portion restricted for the requestor, calculating, at an electronic computing device, a priority factor, the priority factor based on at least one criterion defined by a contextual relation between the requestor and respective user having permission to process the data portion restricted for the requestor; wherein a weight is assigned to each criterion; and
   wherein a data set difference between a response to the query for the requestor and a response to the query for the respective user is determined; and a number of elements of the data set difference is one of criteria on which the priority factor is based;
   based on the priority factor, selecting, at an electronic computing device, among users having permission to process the data portion restricted for the requestor, a contact person for the data portion restricted for the requestor,
   performing, at an electronic computing device, one or more of:
   (i) causing the contact person to be notified about the one or more of: the query, the requestor, the data portion restricted for the requestor, wherein notifying the contact person comprises causing a notification to be provided to a contact person device associated with the contact person,
   (ii) causing the requestor to be notified about the contact person, wherein notifying the requestor comprises causing a notification to be provided to the requestor device.

2. The method according to claim 1, wherein at least one criterion defined by a contextual relation between the requestor and respective user is selected from: being assigned to a same incident scene as the requestor, being engaged in a same task as the requestor, being a member of a same talk group as the requestor, being a commander or a supervisor of the requestor, being a dispatcher who assigned the requestor, and a distance from the requestor.

3. The method according to claim 1, wherein the priority factor is further based on a workload of the respective user.

4. The method according to claim 1, wherein the step of determining users having permission to the data portion restricted for the requestor is performed for users being in relation with the requestor.

5. The method according to claim 1, wherein the respective user being in relation with requestor is one of: a supervisor of the requestor, commander of the requestor, dispatcher who assigned the requestor, user of a same talk group, user being within proximity to the requestor, user assigned to a same task or a same incident.

6. The method according to claim 1, further comprising determining if the data portion restricted for the requestor comprises information relevant to perform a task.

7. The method according to claim 1, further comprising generating the response to the query for the requestor, based on the results of the query not including the data portion restricted for the requestor.

8. The method according to claim 7, wherein determining whether the results of the query include the data portion restricted for the requestor and determining users having permission to the data portion restricted for the requestor comprise:
   for at least two users other than the requestor, generating the response to the query for the respective user based on the results of the query not including the data portion restricted for the respective user and determining the data set difference between the response to the query for the respective user and the response to the query for the requestor; and
   determining users having permission to process the data portion restricted for the requestor by identifying users for whom the data set difference comprises at least one element and this element is not a part of the response to the query for the requestor.

9. The method according to claim 8, wherein for each element of said data set difference not belonging to the response to the query for the requestor, a group of users having permission to process data comprising this element of said data set difference is identified and the steps of calculating a priority factor and selecting a contact person for this element of said data set difference are performed.

10. The method according to claim 7, wherein determining whether the results of the query includes the data portion restricted for the requestor and determining users having permission to the data portion restricted for the requestor, comprise:
generating a response to the query for a theoretical user having access to all data;
determining data set difference between the response to the query for the requestor and the response to the query for the theoretical user; and
determining users having permission to the data portion restricted for the requestor by identifying users having permission to process data comprising at least one element of said data set difference.

11. The method according to claim 10, wherein for each element of said data set difference a group of users having permission to process data comprising this element of said data set difference is identified and the steps of calculating a priority factor and selecting a contact person for the data portion restricted for the requestor are performed for each of the group of users separately.

12. The method according to claim 7, further comprising causing the response to the query for the requestor to be provided to the requestor.

13. The method of claim 12, wherein the response to the query for the requestor is provided to the requestor via a text message, e-mail, audio message, video message or instant message.

14. An electronic processing device for handling a digital assistant query whose results include a data portion restricted for a requestor, the device comprising:
a transceiver for receiving the query from a requestor device associated with the requestor; and
a logic circuitry communicatively coupled to the transceiver, configured to:
perform a database search and obtain the results of the query;
determine whether the results of the query include a data portion restricted for the requestor, the data portion restricted for the requestor being data that the requestor does not have authorization level to access;
responsive to determining that that the results of the query include the data portion restricted for the requestor, determine users having permission to process the data portion restricted for the requestor;
for determined users having permission to process the data portion restricted for the requestor, calculate a priority factor, the priority factor based on at least one criterion defined by a contextual relation between the requestor and respective user having permission to process the data portion restricted for the requestor; wherein a weight is assigned to each criterion; and
wherein a data set difference between a response to the query for the requestor and a response to the query for the respective user is determined; and a number of elements of the data set difference is one of criteria on which the priority factor is based;
based on the priority factor, select, among users having permission to process the data portion restricted for the requestor, a contact person for the data portion restricted for the requestor,
perform one or more of:
(i) causing the contact person to be notified about the one or more of: the query, the requestor, the data portion restricted for the requestor, wherein notifying the contact person comprises causing a notification to be provided to a contact person device associated with the contact person;
(ii) causing the requestor to be notified about the contact person, wherein notifying the requestor comprises causing a notification to be provided to the requestor device.

15. A non-transitory, computer-readable storage medium having program instructions stored thereon that when executed by one or more processors cause a logic circuitry to:
receive a query from a requestor device associated with a requestor;
perform a database search and obtain the results of the query;
determine whether the results of the query include a data portion restricted for the requestor, wherein the data portion restricted for the requestor has a security level assigned, the requestor has an authorization level assigned and the requestor is not authorized to access the data portion;
responsive to determining that that the results of the query include the data portion restricted for the requestor, determine users having permission to process the data portion restricted for the requestor;
for determined users having permission to process the data portion restricted for the requestor, calculating a priority factor, the priority factor based on at least one criterion defined by a contextual relation between the requestor and respective user having permission to process the data portion restricted for the requestor; wherein a weight is assigned to each criterion; and
wherein a data set difference between a response to the query for the requestor and a response to the query for the respective user is determined; and a number of elements of the data set difference is one of criteria on which the priority factor is based;
based on the priority factor, select, among users having permission to process the data portion restricted for the requestor, a contact person for the data portion restricted for the requestor,
perform one or more of:
(i) causing the contact person to be notified about the one or more of: the query, the requestor, the data portion restricted for the requestor, wherein notifying the contact person comprises causing a notification to be provided to a contact person device associated with the contact person;
(ii) causing the requestor to be notified about the contact person, wherein notifying the requestor comprises causing a notification to be provided to the requestor device.

* * * * *